(12) United States Patent
Miwa et al.

(10) Patent No.: US 11,261,988 B2
(45) Date of Patent: Mar. 1, 2022

(54) SOLENOID VALVE

(71) Applicant: DENSO CORPORATION, Kariya (JP)

(72) Inventors: Yuichi Miwa, Kariya (JP); Tetsuya Yoshimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 102 days.

(21) Appl. No.: 16/740,827

(22) Filed: Jan. 13, 2020

(65) Prior Publication Data

US 2020/0224786 A1 Jul. 16, 2020

(30) Foreign Application Priority Data

Jan. 15, 2019 (JP) .............................. JP2019-004404

(51) Int. Cl.
*F16K 31/06* (2006.01)
*F02M 59/34* (2006.01)
*F02M 59/36* (2006.01)

(52) U.S. Cl.
CPC .......... *F16K 31/0655* (2013.01); *F02M 59/34* (2013.01); *F02M 59/366* (2013.01)

(58) Field of Classification Search
CPC .. F16K 31/0655; F16K 31/0693; F16K 31/10; H01F 7/1607; H01F 7/1623; H01F 7/1653; F02M 59/366; F02M 59/367; F02M 59/368
USPC ........................ 251/129.02, 129.07; 123/446
See application file for complete search history.

(56) References Cited

U.S. PATENT DOCUMENTS

| | | | | |
|---|---|---|---|---|
| 3,592,392 A * | 7/1971 | Huber | ................... | H01F 7/1638 239/585.2 |
| 4,647,008 A * | 3/1987 | Shirai | ................. | F16K 31/0655 251/129.07 |
| 4,957,275 A * | 9/1990 | Homes | ................. | F02M 59/366 251/129.02 |
| 6,619,615 B1 * | 9/2003 | Mayr | ........................ | H01F 7/13 251/129.08 |
| 6,807,943 B2 * | 10/2004 | VanWeelden | ........ | F02M 59/366 123/458 |
| 6,976,665 B2 * | 12/2005 | Seitz | ........................ | B60T 8/363 251/129.02 |
| 7,198,033 B2 * | 4/2007 | Inaguma | ............. | F02D 41/3845 123/198 D |
| 7,451,741 B1 * | 11/2008 | Bartley | ................ | F02M 59/102 123/445 |
| 7,857,282 B2 * | 12/2010 | Goossens | ............ | F16K 31/0655 251/129.07 |
| 8,002,206 B2 * | 8/2011 | Shafer | ................... | F02M 47/027 239/585.1 |
| 8,348,231 B2 * | 1/2013 | Czimmek | ........... | F16K 31/0693 251/129.07 |

(Continued)

*Primary Examiner* — Matthew W Jellett
(74) *Attorney, Agent, or Firm* — Nixon & Vanderhye P.C.

(57) ABSTRACT

A solenoid valve includes an inner stator and an outer stator that are part of a magnetic circuit. An armature is attracted toward the inner stator when a coil is energized. A spring biases the armature in a direction away from the inner stator. A rod is integrally formed with the armature and integrally reciprocates with the armature. A guide guides reciprocation of the rod. A valve operates by following the rod to open and close a fuel/liquid passage. The spring and sliding portions between the rod and the guide are arranged within a recess portion formed in the inner stator and arranged in parallel to each other while overlapping in the axial direction.

14 Claims, 15 Drawing Sheets

(56) References Cited

U.S. PATENT DOCUMENTS

| | | | |
|---|---|---|---|
| 9,297,471 B2* | 3/2016 | Arikawa | F16K 31/0658 |
| 2004/0223856 A1* | 11/2004 | Rembold | F02M 63/0015 |
| | | | 417/222.2 |
| 2013/0306895 A1 | 11/2013 | Arikawa et al. | |
| 2016/0186732 A1 | 6/2016 | Xi et al. | |
| 2017/0152824 A1* | 6/2017 | Seera | F04B 53/10 |
| 2018/0230955 A1* | 8/2018 | Bleeck | F02M 59/368 |
| 2019/0170047 A1 | 6/2019 | Venekamp et al. | |

* cited by examiner

HARDNESS OF GUIDE (301) >
HARDNESS OF INNER STATOR (22)

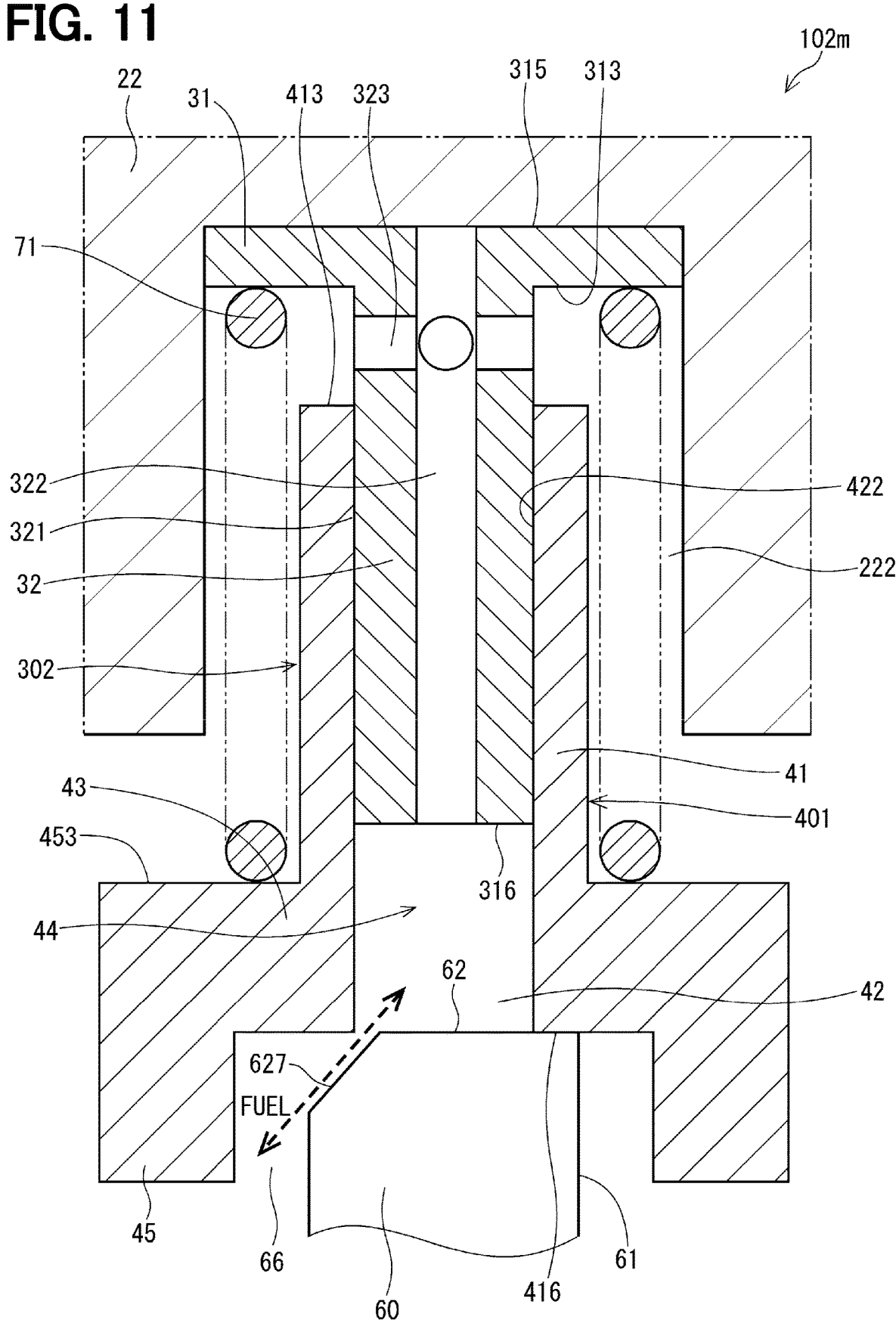

HARDNESS OF ROD (405) >
HARDNESS OF ARMATURE (55)

SOLENOID VALVE

CROSS REFERENCE TO RELATED APPLICATION

The present application claims the benefit of priority from Japanese Patent Application No. 2019-4404 filed on Jan. 15, 2019. The entire disclosure of the above application is incorporated herein by reference.

TECHNICAL FIELD

The present disclosure relates to a solenoid valve.

BACKGROUND

Certain solenoid valves (or electromagnetic valves) are known to open and close a liquid passage through the operation of a valve element that follows an armature which, when a coil is energized, is attracted to a core.

SUMMARY

A solenoid valve of the present disclosure includes a coil, an inner stator, an outer stator, an armature, a spring, a rod, a guide, and a valve.

The inner stator is formed radially inward of the coil, the inner stator being part of a magnetic circuit. The outer stator is formed radially outward of the inner stator, the outer stator being part of the magnetic circuit. The armature is attracted toward the inner stator when the coil is energized. The spring biases the armature in a direction away from the inner stator.

The rod is fixed to the armature or integrally formed with the armature, the rod being configured to integrally reciprocate with the armature. The guide guides reciprocation of the rod. The valve operates by following the rod to open and close a liquid passage. The spring and sliding portions between the rod and the guide are arranged within a recess portion formed in the inner stator and arranged in parallel to each other while overlapping in the axial direction.

BRIEF DESCRIPTION OF DRAWINGS

FIG. 11 is an expanded cross-sectional view of a solenoid valve according to a modification of the second embodiment.

DETAILED DESCRIPTION

Figure 1:
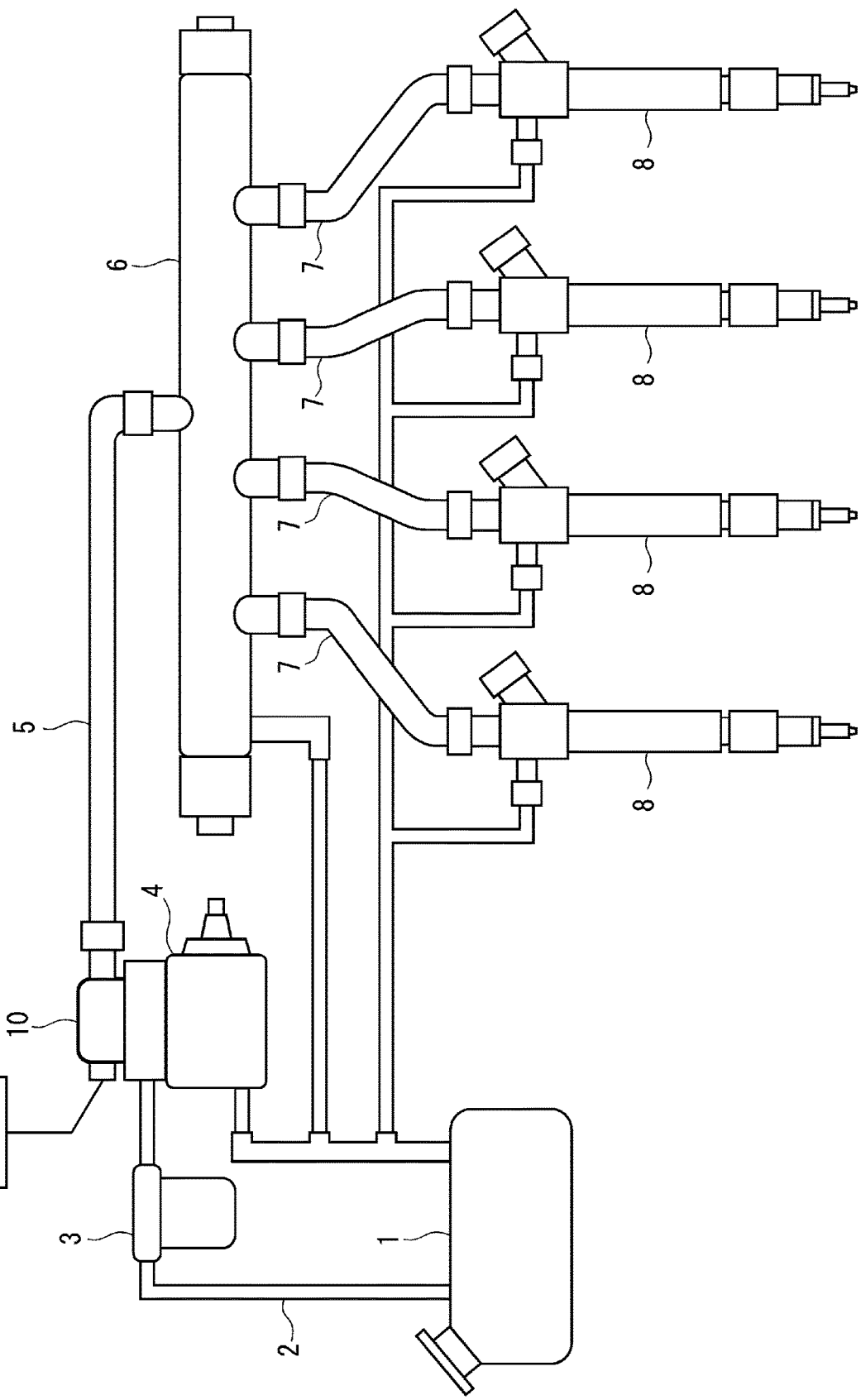
FIG. 1 is an overall configuration diagram of a common rail system to which a solenoid valve according to an embodiment is applied.

Hereinafter, a plurality of embodiments of a solenoid valve will be described with reference to the drawings. In a plurality of embodiments, the same reference marks are used for substantially the same elements, and description thereof will be omitted. The following first to sixth embodiments may be collectively referred to as "the present embodiment". A solenoid valve 10 (also referred to as an electromagnetic valve) of the present embodiment is applied to a supply pump for a common rail system of a diesel engine, and functions as an intake valve that opens and closes a fuel passage. This fuel passage may be generally referred to as a "liquid passage".

[Common Rail System and Supply Pump]

First, the overall configuration of a common rail system will be described with reference to FIG. 1. The common rail system is formed by a fuel tank 1, a supply pump 4, a common rail 6, a plurality of fuel injection valves 8, as well as piping that connects these components to each other. The fuel tank 1 and the supply pump 4 are connected by a low pressure fuel pipe 2. A fuel filter 3 for removing foreign materials is provided in the low pressure fuel pipe 2.

The supply pump 4 and the common rail 6 are connected by a pre-rail high pressure fuel pipe 5. The common rail 6 and the plurality of fuel injection valves 8 are connected by a plurality of post-rail high pressure fuel pipes 7. The supply pump 4 pressurizes low pressure fuel drawn from the fuel tank 1 and supplies the high pressure fuel to the common rail 6. The solenoid valve 10 meters the amount of fuel sucked into the supply pump 4 in accordance with instructions from an ECU 9. Here, it should be noted that illustrations and descriptions of other signal lines input/output by the ECU 9 in the common rail system are omitted.

The high pressure fuel supplied to the common rail 6 is distributed to the plurality of fuel injection valves 8 (four in the example of FIG. 1). The fuel injection valves 8 inject fuel into cylinders of the engine. Any fuel which is not supplied downstream of the supply pump 4, the common rail 6, or the fuel injection valve 8 or not consumed by injection is returned to the fuel tank 1 via a return pipe.

Figure 2:
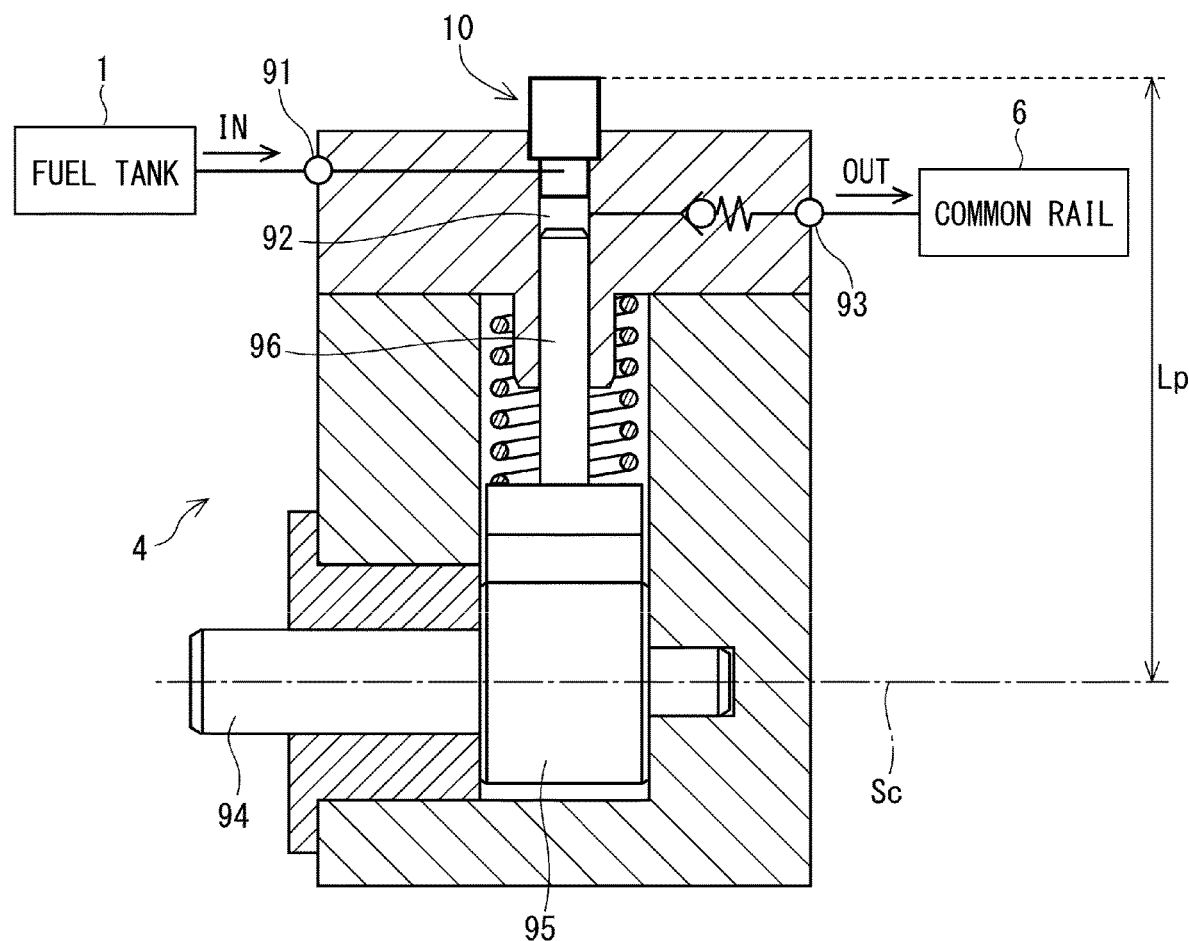
FIG. 2 is a schematic cross-sectional view of a supply pump.

FIG. 2 shows a schematic configuration of the supply pump 4. The solenoid valve 10 functions as a suction valve for fuel supplied from the fuel tank 1 via a fuel inlet 91. That is, the solenoid valve 10 is configured to open and close a valve (also known as a valve element) in accordance with instructions from the ECU 9, so as to control a desired amount of fuel to be sucked into a pumping chamber 92. When a cam 95 rotates about a cam shaft 94, a plunger 96 reciprocates to pressurize the fuel in the pumping chamber 92, and the resulting high pressure fuel is pressure fed from a discharge port 93 to the common rail 6.

Here, since the physical size of the supply pump 4 is determined by a distance Lp from the end face of the solenoid valve 10 to a central axis Sc of the camshaft 94, the mountability of the supply pump 4 is reduced if the size of the solenoid valve 10 is large. However, in order to ensure the operation reliability of the valve, the sliding portion of the solenoid valve 10 must be maintained at or above a predetermined L/D value (that is, the length of the sliding portion with respect to the diameter of the sliding portion), and the hardness of the sliding portion of the solenoid valve 10 must be maintained at or above a predetermined hardness value. As a result, it is difficult to reduce the size of the solenoid valve 10.

Figure 8:
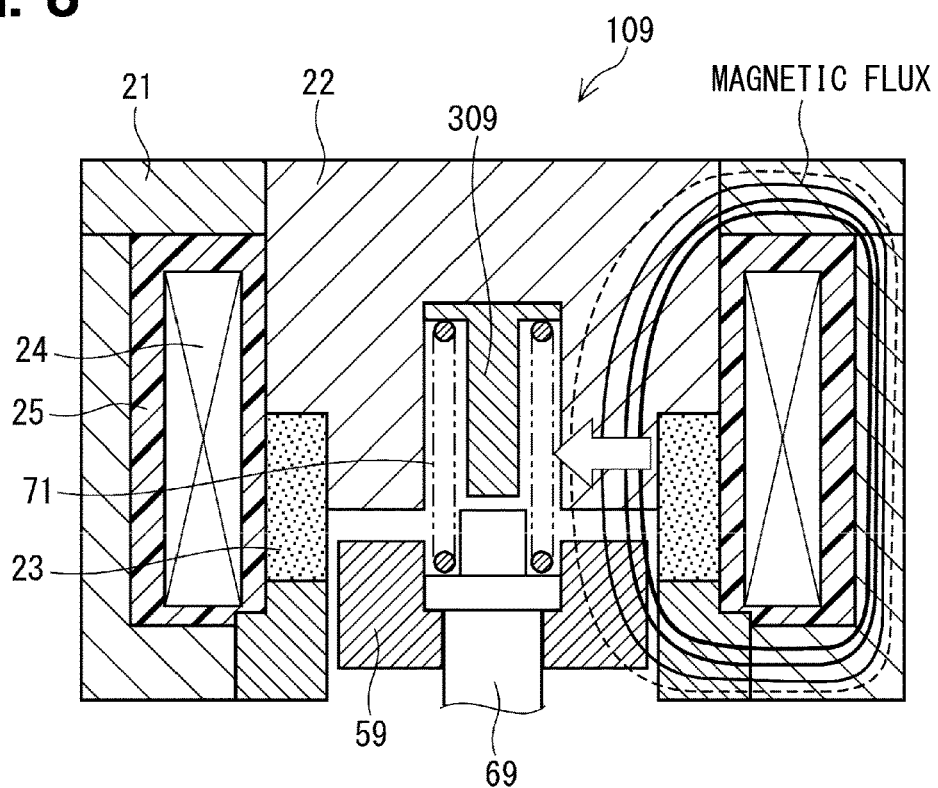
FIG. 8 is a diagram for explaining the influence of magnetic flux in a solenoid valve of a comparative example.

On the other hand, as shown in FIG. 8, in a typical stator (which is a magnetic circuit component), magnetic flux is generated from the vicinity of a coil, and the remote portion has little influence to the rising response of the magnetic force, which is important for valve responsiveness. Therefore, in the present embodiment, focusing on these points, the sliding portion and the spring are arranged inside the stator, thereby decreasing the size of the solenoid valve while ensuring responsiveness.

[Solenoid Valve]

Next, the structure and operational effects of the solenoid valve 10 of the present embodiment are described for each embodiment. The reference numeral of the solenoid valve of each embodiment is denoted by the embodiment number as the third digit following "10". Hereinafter, regarding the operation of the solenoid valve 10, the phrase "when the coil is energized/not energized" may be simplified as "when energized/not energized" where appropriate.

First Embodiment

Figure 3:
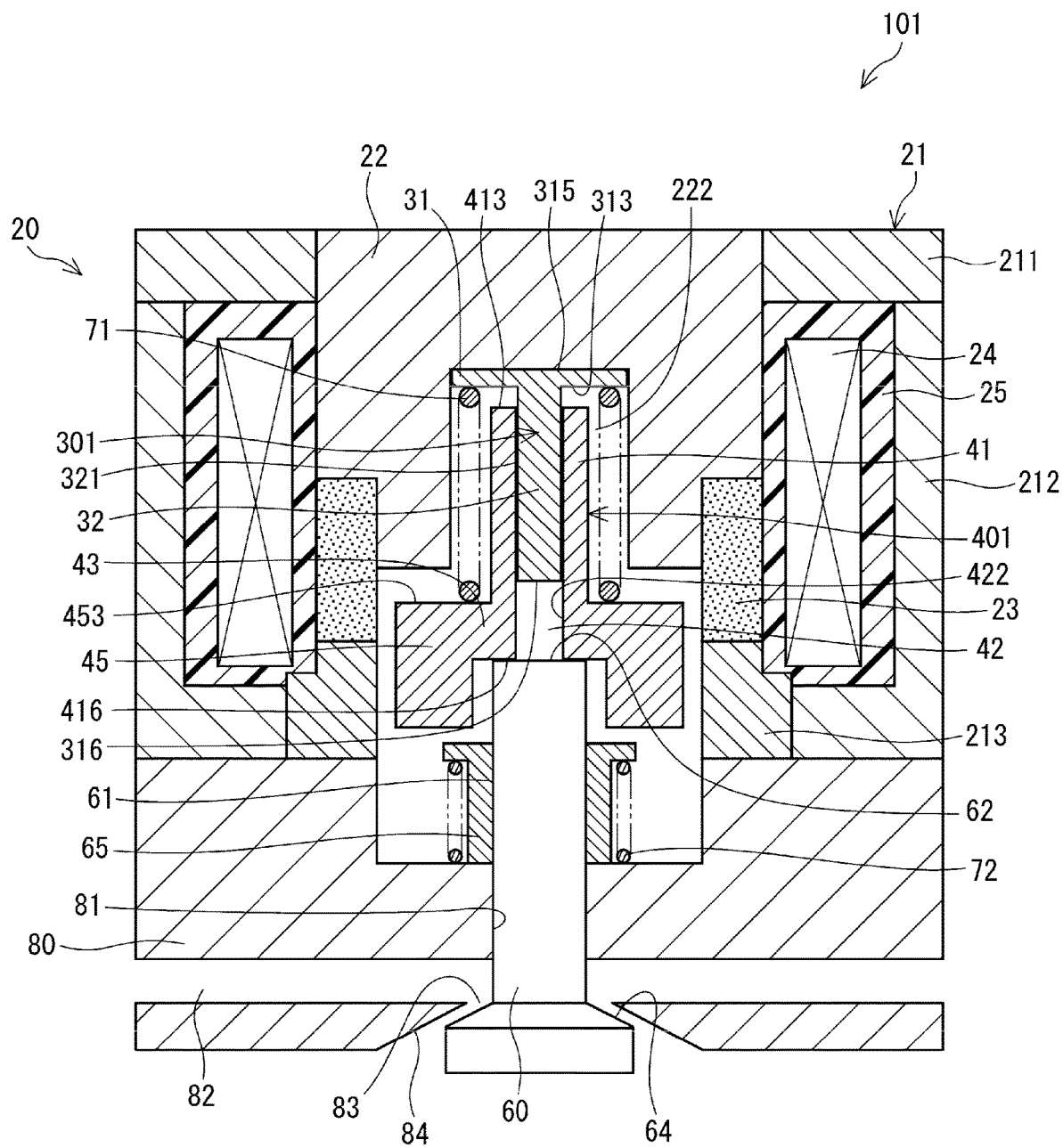
FIG. 3 is a cross-sectional view of the solenoid valve according to the first embodiment when not energized.
Figure 4:
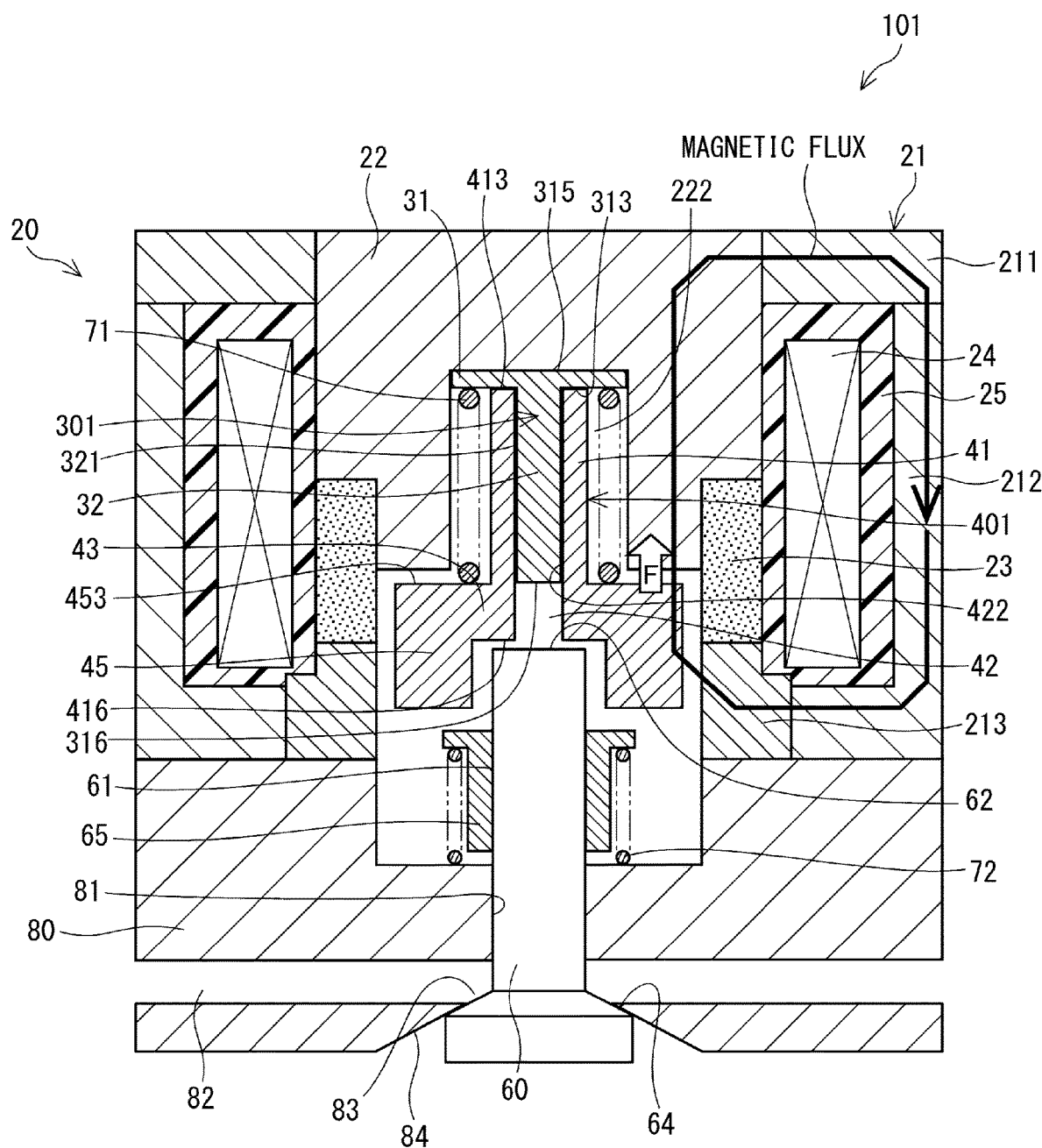
FIG. 4 is a cross-sectional view of the solenoid valve according to the first embodiment when energized.
Figure 5:
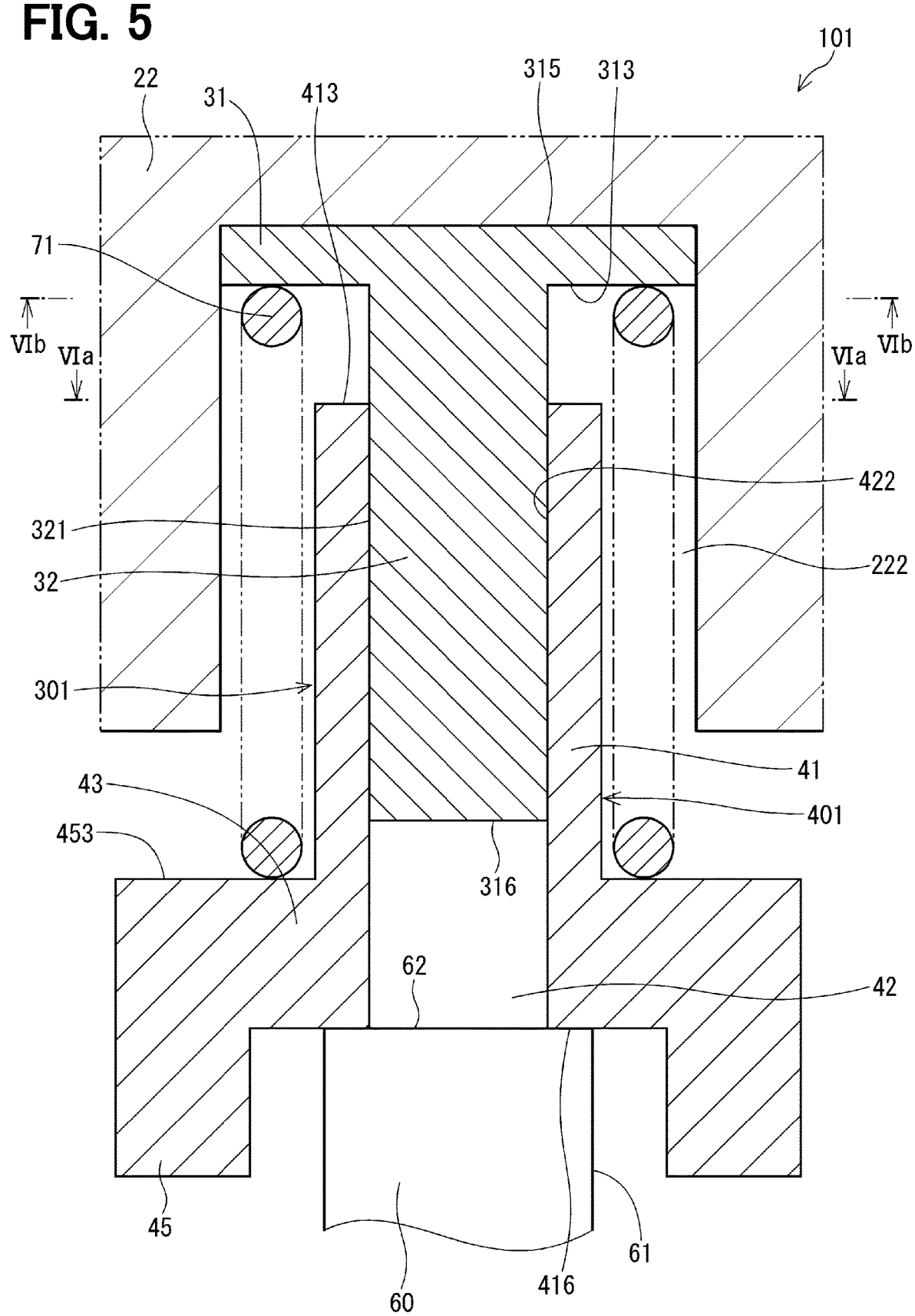
FIG. 5 is an expanded cross-sectional view around the guide and rod of FIG. 3.

A solenoid valve 101 of the first embodiment will be described with reference to FIGS. 3 to 6. FIG. 3 shows a cross-sectional view when not energized, while FIG. 4 shows a cross-sectional view when energized. Hereinafter, when describing the configuration of the solenoid valve 101, for the sake of convenience, the upward direction in FIGS. 3 and 4 may be referred to as "up", and the downward direction in FIGS. 3 and 4 may be referred to as "down". However, when the solenoid valve 101 is actually mounted, the actual vertical direction does not necessarily match the illustrated vertical direction. FIGS. 3 and 4 are schematic views and do not reflect actual dimensional ratios. FIG. 5 is an expanded cross-sectional view of the periphery of the guide and rod of FIG. 3 when not energized.

As shown in FIGS. 3 and 4, the solenoid valve 101 is primarily composed of a solenoid unit 20, a valve 60, and a seat block 80. The solenoid unit 20 includes a coil 24, an inner stator 22, an outer stator 21, an armature 45, a rod 401, a guide 301, a spring 71, and the like.

The coil 24 is a conductive wire wound in a cylindrical shape and forms a magnetic field when energized. The periphery of the coil 24 is insulated by a resin portion 25. The inner stator 22 is formed from an upper portion of the coil 24 to a middle portion of the coil 24 along the axial direction. In addition, the inner stator 22 is formed on the radially inward side of the coil 24. The inner stator 22 is part of a magnetic circuit. The outer stator 21 is formed on the radially outer side of the inner stator 22 and is part of the magnetic circuit. Hereinafter, references to "radially inner side" or "radially outer side" may be simply abbreviated as "inward" or "outward" when the context of radial direction is obvious.

The outer stator 21 includes a first outer stator 211 positioned above the coil 24, a second outer stator 212 positioned outward of and below the coil 24, and a third outer stator 213 below the coil 24 and inward of the second outer stator 212. Inward of the coil 24, a collar 23 made of a nonmagnetic material is provided between the inner stator 22 and the third outer stator 213 to prevent a short circuit of the magnetic circuit. The specific details with regard to the magnetic circuit are not essential to the present disclosure, and as such, detailed descriptions thereof are omitted. As an exemplary configuration, the magnetic circuit described in Japanese Patent No. 5857878 is incorporated herein by reference. In the event of inconsistent usages between this document and the disclosures of JP 5857878 B, the usage in the incorporated reference of JP 5857878 B should be considered supplementary to that of this document; for irreconcilable inconsistencies, the usage in this document controls. In the first embodiment, the armature 45 and the rod 401 are integrally formed. Therefore, "armature and rod" refers to a single component, and a portion thereof may be interpreted as an "armature portion". However, in this specification, even if the armature and rod is an integral member in shape, the two portions are functionally independent. Accordingly, the portion with the armature function is referred to as the armature 45, and the portion with the rod function is referred to as the rod 401. In the below embodiments, with the exception of the fifth embodiment, rods 401, 403, and 406 are formed integrally with the armature 45 in the same manner.

The armature 45 and the rod 401 are formed in a coaxial cylindrical shape. The armature 45 has a relatively large diameter and a short axial length, whereas the rod 401 has a small diameter and a long axial length. The rod 401 includes a stepped portion 43 formed as a step shape on the lower end side of a cylindrical portion 41. The stepped portion 43 has a diameter which is greater than that of the cylindrical portion 41 as a step. The armature 45 is connected to the radially outer side of the step portion 43 of the rod 401, and an upper surface 453 of the step portion 43 faces the end surface of the inner stator 22. When the coil 24 is energized, the upper surface 453 of the step portion 43 is attracted to the inner stator 22. Along with this, the rod 401, which is formed integrally with the armature 45, reciprocates integrally with the armature 45. The rod 401 of the first embodiment includes the cylindrical portion 41. A guide hole 42 is formed in the cylindrical portion 41. The guide hole 42 opens toward the guide 301. The guide hole 42 of the first embodiment also opens toward the valve 60 opposite to the guide 301, and is formed along the axial direction. An upper end surface 413 of the cylindrical portion 41 faces a flange portion 31 of the guide 301, and a lower end surface 416 of the cylindrical portion 41 faces an upper end surface 62 of the valve 60.

The guide 301 is fixed to a recessed portion 222 of the inner stator 22 and guides the reciprocating movement of the rod 401. The guide 301 of the first embodiment includes a flange portion 31 and a shaft portion 32 which are formed coaxially. The axial direction cross section of the guide 301 is approximately T-shape. An upper surface 315 of the flange portion 31 is in contact with the bottom of the recessed portion 222. A part of the lower surface of the flange portion 31 immediately outward of the shaft portion 32 corresponds to a "contact portion 313".

The shaft portion 32 extends downward from the flange portion 31, i.e., toward the valve 60, and an end surface 316 of the shaft portion 32 faces the center portion of the upper end surface 62 of the valve 60. When the rod 401 reciprocates, an inner wall 422 of the guide hole 42 of the rod 401 slides against an outer wall 321 of the shaft portion 32 of the guide 301. This configuration is advantageous in that easy of manufacturing, i.e., manufacturability is improved.

Further, the amount of movement permitted for the rod 401 is regulated by an upper end surface 413 of the cylinder part 41 of the rod 401 colliding with the contact part 313 of the guide 301.

The guide 301 has a higher hardness than the inner stator 22. For example, the guide 301 is preferably made of Martensitic stainless steel or bearing steel, with a Rockwell C scale hardness HRc of preferably 50 or more. As a result, the reliability of the sliding and contact portions may be improved.

The spring 71 is a cylindrical elastic member, and is typically a coil spring. The spring 71 is inserted around the cylindrical portion 41 of the guide 301 and is interposed between the flange portion 31 of the guide 301 and the step portion 43 of the rod 401. The spring 71 biases the armature 45 in a direction away from the inner stator 22.

As described above, in the recess portion 222 formed in the inner stator 22, the shaft portion 32 of the guide 301, the cylinder portion 41 of the rod 401, and the spring 71 are arranged in this order from radially inward to outward. In other words, in the recess 222 formed in the inner stator 22, the sliding portions between the rod 401 and the guide 301 and the spring 71 are arranged in parallel to each other while overlapping in the axial direction.

The peripheral portions of the upper end surface 62 of the valve 60 faces the lower end surface 416 of the rod 401. A seal portion 64 of the valve 60, which is configured to abut a seat surface 84, is provided on the lower end side. A spring holder 65 is fixed to an outer wall 61 of the valve 60. A valve spring 72 is disposed between the spring holder 65 and the seat block 80. The valve spring 72 biases the valve 60 upward, i.e., toward the rod 401.

The seat block 80 includes a valve guide hole 81, a fuel passage 82 that acts as a "liquid passage", an opening 83, the seat surface 84, and the like. The outer wall 61 of the valve 60 slides against the valve guide hole 81. As such, the valve guide hole 81 guides the reciprocating movement of the valve 60. The fuel passage 82 is in communication with the fuel inlet 91 of FIG. 2, and allows fuel supplied from the fuel tank to flow in.

When the valve 60 is open, fuel is sucked from the fuel passage 82 into the pumping chamber 92 of FIG. 2 through the gap between the seat surface 84 formed around the opening 83 and the seal portion 64 of the valve 60. When the valve 60 is closed, the seal portion 64 comes into contact with the seat surface 84, and the intake of fuel is stopped. By controlling the opening and closing of the valve 60 in this way, the amount of fuel sucked into the pumping chamber 92 is metered.

Next, the operation of the solenoid valve 101 will be described. When the coil 24 is energized from the state shown in FIG. 3, a magnetic flux passing through the magnetic circuit is generated as shown by the arrow in FIG. 4. As a result, an magnetic force F indicated by the block arrow "F" is generated between the inner stator 22 and the upper surface 453 of the step portion 43. When the sum of the magnetic force F and the biasing force of the valve spring 72 exceeds the biasing force of the spring 71, the rod 401, which is formed integrally with the armature 45, moves upward while sliding against the guide 301. When the rod 401 is lifted, the valve 60 is lifted and closed by the biasing force of the valve spring 72. Here, the amount of movement permitted is regulated by the upper end surface 413 of the rod 401 colliding with the contact part 313 of the guide 301.

When the energization of the coil 24 is turned off from the state of FIG. 4 and the magnetic force F falls under the biasing force of the spring 71, the rod 401, which is formed integrally with the armature 45, moves downward while sliding against the guide 301. When the lower end surface 416 of the rod 401 comes into contact with the upper end surface 62 of the valve 60, the valve 60 moves downward together with the rod 401 and opens, returning to the state shown in FIG. 3. In this manner, the valve 60 operates by following the movements of the rod 401 to open and close the fuel passage 82.

Figure 6A:
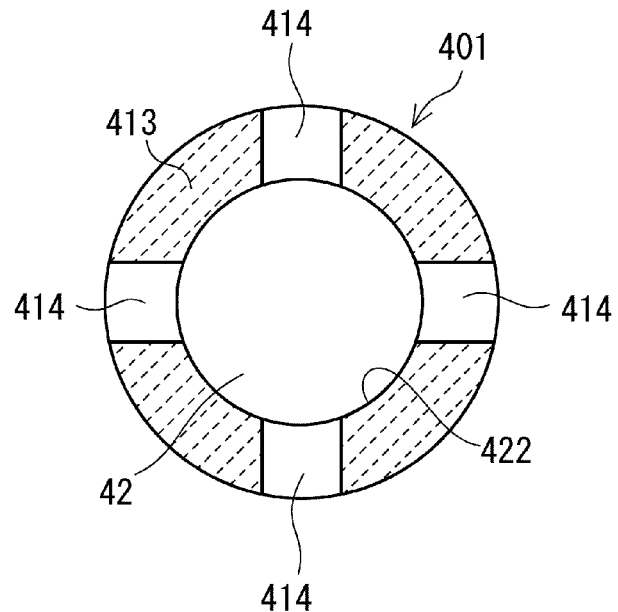
FIG. 6A is a cross-sectional view taken along the line VIa-VIa of FIG. 5.
Figure 6B:
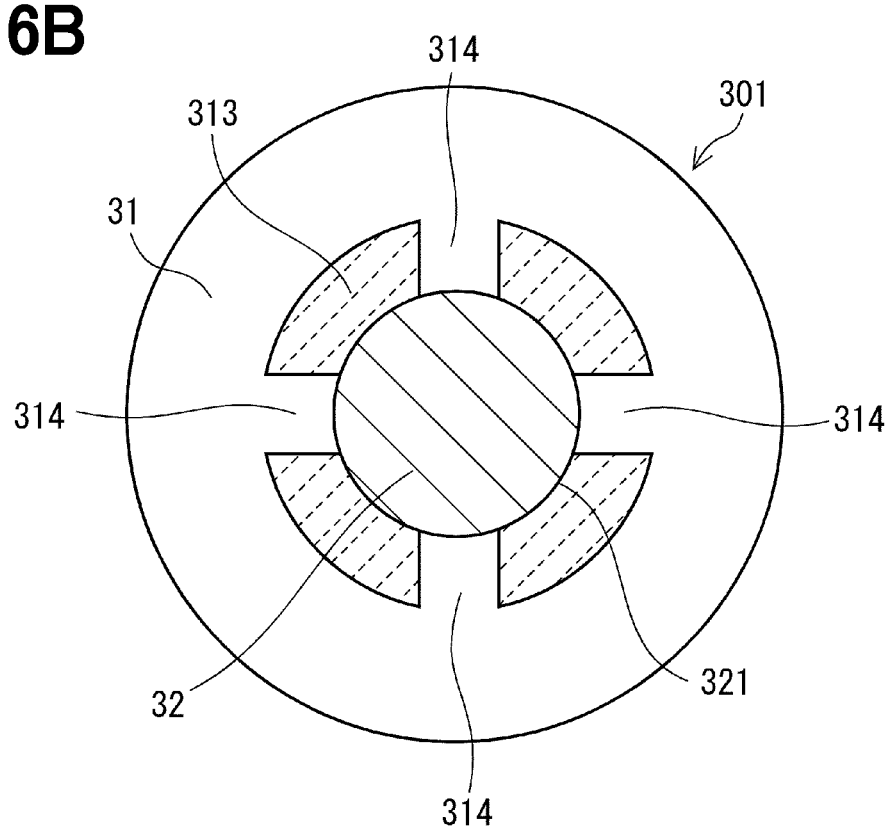
FIG. 6B is a cross-sectional view taken along the line VIb-VIb of FIG. 5 as a modification of the first embodiment.

It should be noted that if the contact area between the upper end surface 413 of the rod 401 and the contact portion 313 during energization is large, there is a possibility that ringing may occur due to adhesive forces when energization is stopped and these surfaces separate from each other. Therefore, for example as shown in FIG. 6A, relief grooves 414 are preferably formed on the upper end surface 413 of the cylindrical portion 41 of the rod 401. Alternatively, as shown in FIG. 6B, relief grooves 314 may be formed in the contact portion 313 of the guide 301. In other words, while the relief grooves 314 may be formed at the same height as the lower surface of the flange portion 31, the contact portion 313 may be formed with a slightly higher height, i.e., in a protruding shape. As a further alternative, both the relief grooves 314 and 414 in FIGS. 6A and 6B may be formed.

As described above, the relief grooves 314 and 414 are formed in at least one of the upper end surface 413 of the cylindrical portion 41 of the rod 401 or the contact portion 313 of the guide 301, whereby the ringing force can be reduced. It should be noted that the relief grooves 314 and 414 are not limited to the four illustrated locations, as long as one or more of such grooves are formed. Further, the same effect can be obtained from not only radial grooves but also from annular grooves or a plurality of dispersed recesses.

Figure 7:
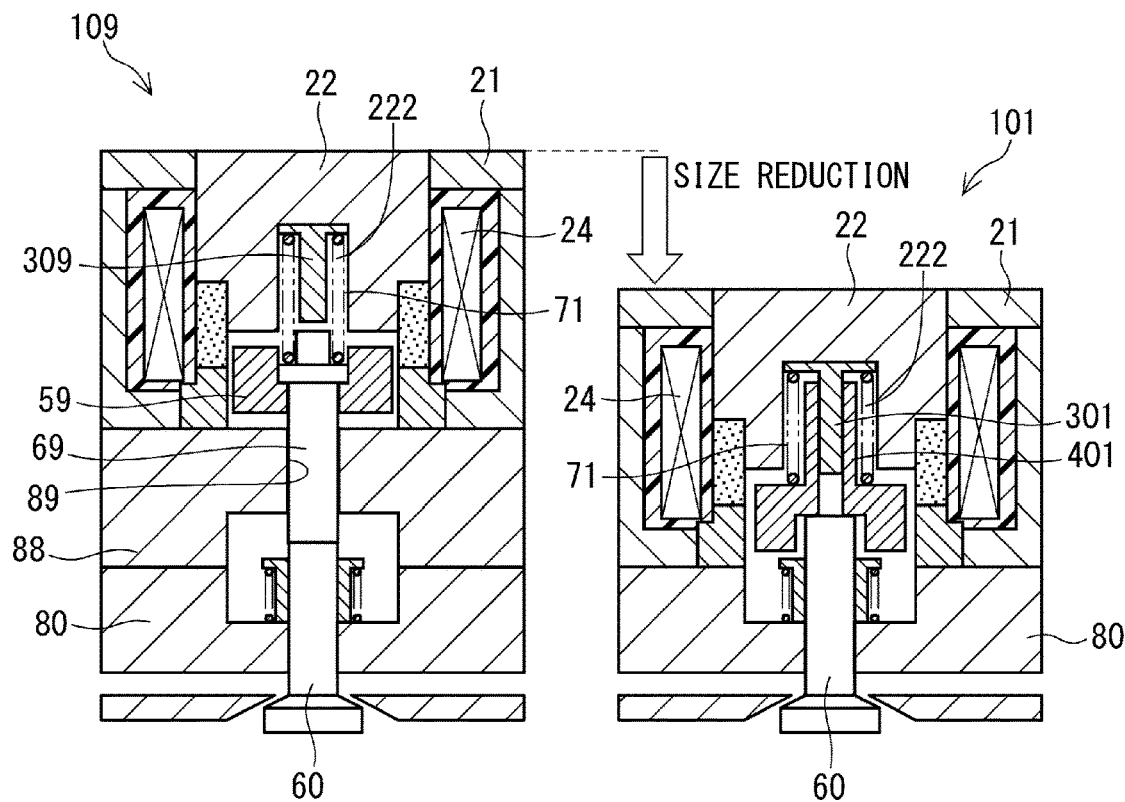
FIG. 7 is a diagram comparing sizes with a solenoid valve of a comparative example.

Next, the effect of the present embodiment will be described with reference to FIGS. 7 and 8. FIG. 7 shows the difference in physical size between an solenoid valve 109 of a comparative example and the solenoid valve 101 of the first embodiment. For the solenoid valve 109 of the comparative example, elements which are substantively the same as those of the solenoid valve 101 are denoted by the same reference numeral and description thereof is omitted.

The solenoid valve 109 of the comparative example is configured such that a guide block 88 having a guide hole 89 is provided between an outer stator 21 and a seat block 80. A rod 69 fixed to an armature 59 is inserted into the guide hole 89, and the inner wall of the guide hole 89 and the outer wall of the rod 69 slide against each other. Inside the inner stator 22, a core-side stopper 309 is provided which restricts the amount of movement of the rod 69 while housing one end of the spring 71. The spring 71 biases the armature 59 in a direction away from the inner stator 22.

Here, it should be noted that in the field of solenoid valves, for example for a solenoid valve that opens and closes a suction passage of a supply pump of a diesel engine, there is a growing concern in that there may be an insufficient amount of mounting space in the engine. As such, it would be desirable to reduce the physical size of the components in such solenoid valves. In addition, with regard to fuel metering, rather than the conventional intake metering method, it would be desirable to implement a timing control method which has higher pressure controllability. However, the timing control method is disadvantageous in terms of mountability because the solenoid valve is disposed above the suction valve, which increases physical size. Furthermore, when reducing the size of a solenoid valve, it is also important to ensure the rising response of the magnetic force when the coil is energized.

In this regard, in the configuration of solenoid valve 109 of the comparative example, since the sliding portions of the rod 69 and the guide hole 89 are not disposed inside the inner stator 22 and are disposed at a position different from the spring 71 in the axial direction, the physical size of the device is increased in the axial direction. As such, there is room for improvement for the solenoid valve 109 of the comparative example with respect to reducing size in order to improve (or allow the improvement of) mountability and responsiveness. In contrast, according to the solenoid valve 101 of the first embodiment, in the recess 222 formed in the inner stator 22, the sliding portions between the rod 401 and the guide 301 and the spring 71 are arranged in parallel to each other while overlapping in the axial direction. Therefore, in contrast to the solenoid valve 109 of the comparative example, the guide block 88 is not required, and the size of the entire device can be reduced by the length of the guide block 88 in the axial direction. As a result, physical size in the axial direction may be reduced. Further, since the influence of magnetic flux is low on the radially inner side of the magnetic circuit, physical size can be reduced while ensuring responsiveness by putting the rod, the guide, and the spring together inside the inner stator.

FIG. 8 shows the influence of magnetic flux in the solenoid valve 109 of the comparative example. In the axial cross section of the coil 24, the magnetic flux passes through a magnetic circuit including the outer stator 21, the inner stator 22, the armature 45 and the like. A thick line indicates a relatively strong magnetic field line, and a thin line indicates a relatively weak magnetic field line. As illustrated, since the influence of magnetic flux is low on the radially inner side of the magnetic circuit, for the configuration of the present embodiment, physical size can be reduced while ensuring responsiveness by putting the rod 401, the guide 301, and the spring 71 together inside the inner stator 22.

Second Embodiment

Since the operation of the solenoid valve in the second and subsequent embodiments is basically the same as that in the first embodiment, only the cross-sectional view during non-energization is shown, and the cross-sectional view during energization is omitted. In the second to fourth embodiments, the difference from the first embodiment is shown by an expanded cross-sectional view corresponding to FIG. 5 of the first embodiment.

Figure 9:
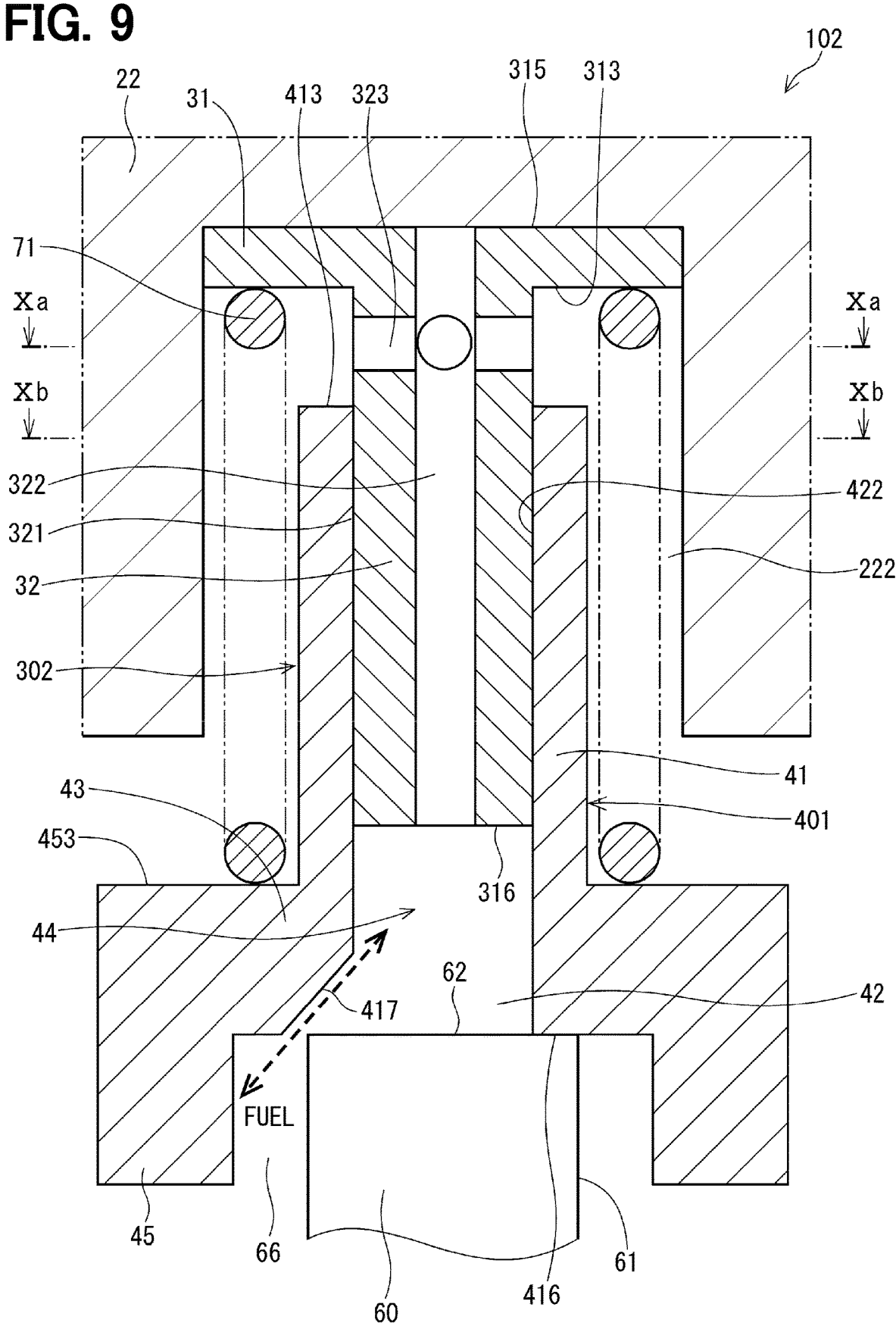
FIG. 9 is an expanded cross-sectional view around the guide and rod of a solenoid valve of a second embodiment.
Figure 10A:
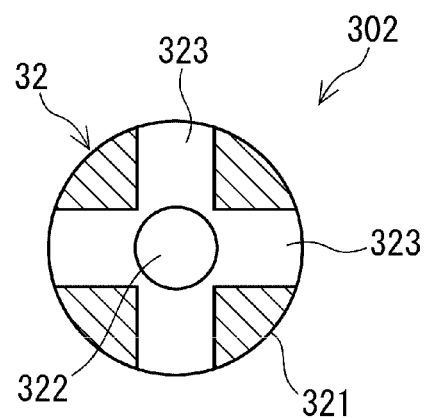
FIG. 10A is a cross-sectional view taken along line Xa-Xa in FIG. 9.
Figure 10B:
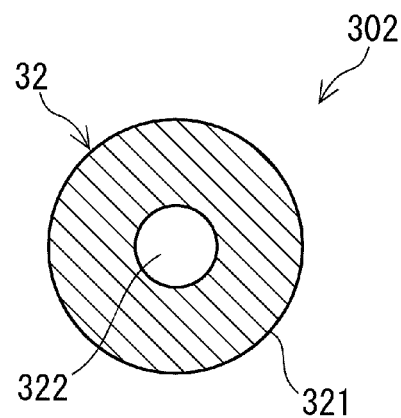
FIG. 10B is a cross-sectional view taken along line Xb-Xb in FIG. 9.

A solenoid valve 102 of a second embodiment is shown in FIG. 9, FIG. 10A and FIG. 10B. The solenoid valve 102 of the second embodiment is different from the solenoid valve 101 of the first embodiment with respect to the configuration of the guide 302. The guide 302 includes an axial communication hole 322 that passes through the center of the shaft portion 32 and a radial communication hole 323 formed in the guide 302 at a position closer toward the flange portion 31 than the upper end surface 413 of the rod 401 when de-energized. In addition, the radial communication hole 323 communicates the outer wall 321 of the shaft portion 32 to the axial communication hole 322. It should be noted that although four radial communication holes 323 are illustrated, this is not limiting as long as one or more of such radial communication holes 323 are formed.

Hereinafter, the portion of the guide hole 42 between the end surface 316 of the shaft portion 32 of the guide 302 and the upper end surface 62 of the valve 60 is referred to as an "intermediate chamber 44". The axial communication hole 322 and the radial communication hole 323 function as a "communication path" that communicates the intermediate chamber 44 to the recess 222 of the inner stator 22. In addition, a notch 417 is formed in the rod 401 at the contact portion between the lower end surface 416 of the rod 401 and the upper end surface 62 of the valve 60. The notch 417 connects the intermediate chamber 44 to the radially outer space 66 of the valve 60, such that fuel flows as shown by the dashed arrow. It should be noted that the rod is denoted the reference numeral "401" regardless of the presence or absence of the notch 417.

With this configuration, in the second embodiment, when the armature 45 is attracted during energization and the volume of the fuel storage space changes, fuel flows through the intermediate chamber 44. As a result, generation of operating resistance due to fuel compression and expansion is prevented, and fuel filling performance and replacement performance are improved.

Modification of Second Embodiment

A solenoid valve 102m according to a modification of the second embodiment shown in FIG. 11 has a notch 627 formed on the upper end surface 62 of the valve 60 in place of the notch 417 on the rod 401. Specifically, the notch 627 is formed at the contact portion between the lower end surface 416 of the rod 401 and the upper end surface 62 of the valve 60. The notch 627 communicates the intermediate chamber 44 to the space 66 on the radially outer side of the valve 60, and fuel flows as indicated by the dashed arrow. It should be noted that the valve is denoted the reference numeral "60" regardless of the presence or absence of the notch 627. Further, both the notch 417 on the rod 401 and the notch 627 on the valve 60 may be formed.

Third and Fourth Embodiments

Figure 12:
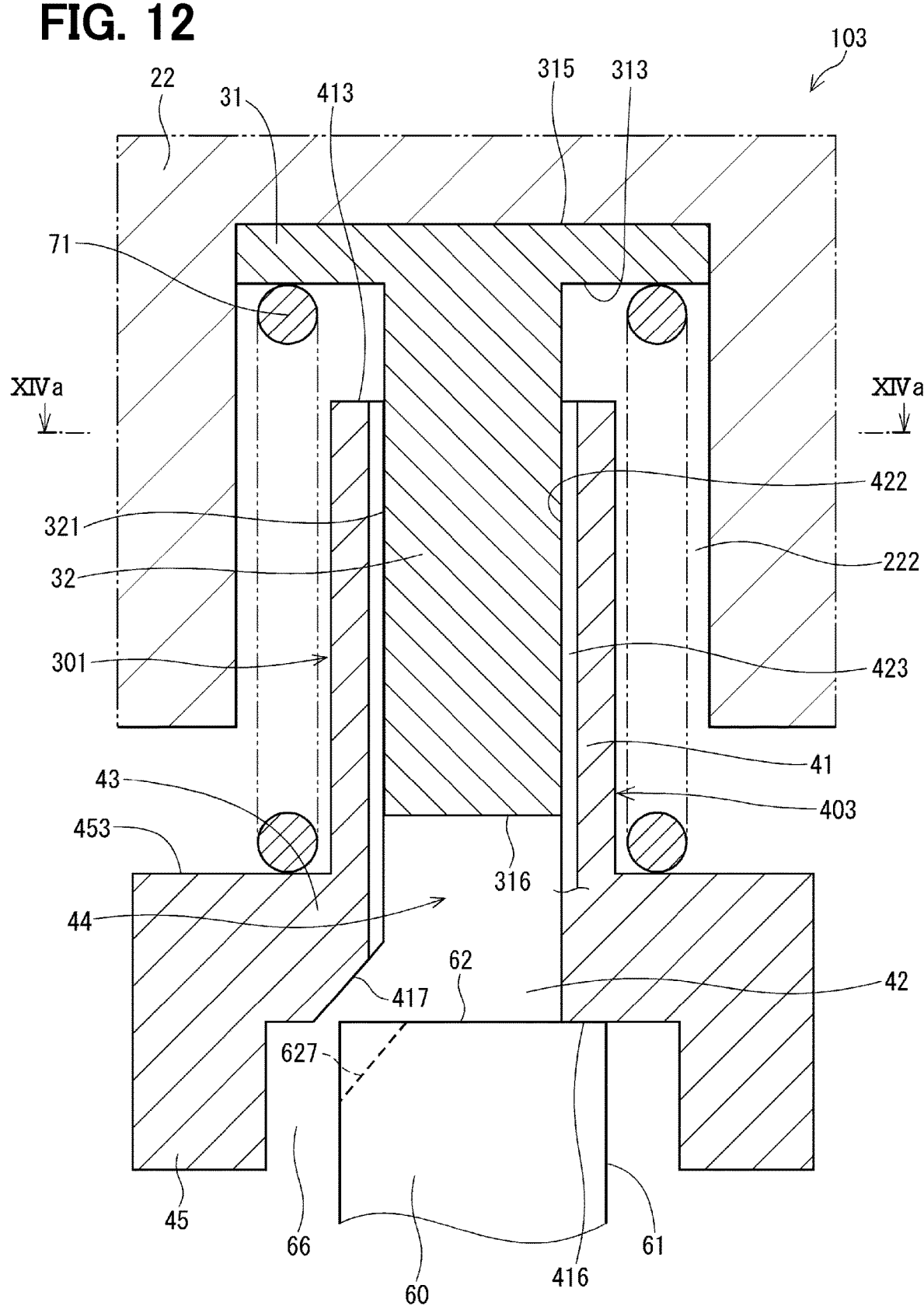
FIG. 12 is an expanded cross-sectional view around the guide and rod of a solenoid valve of a third embodiment.
Figure 13:
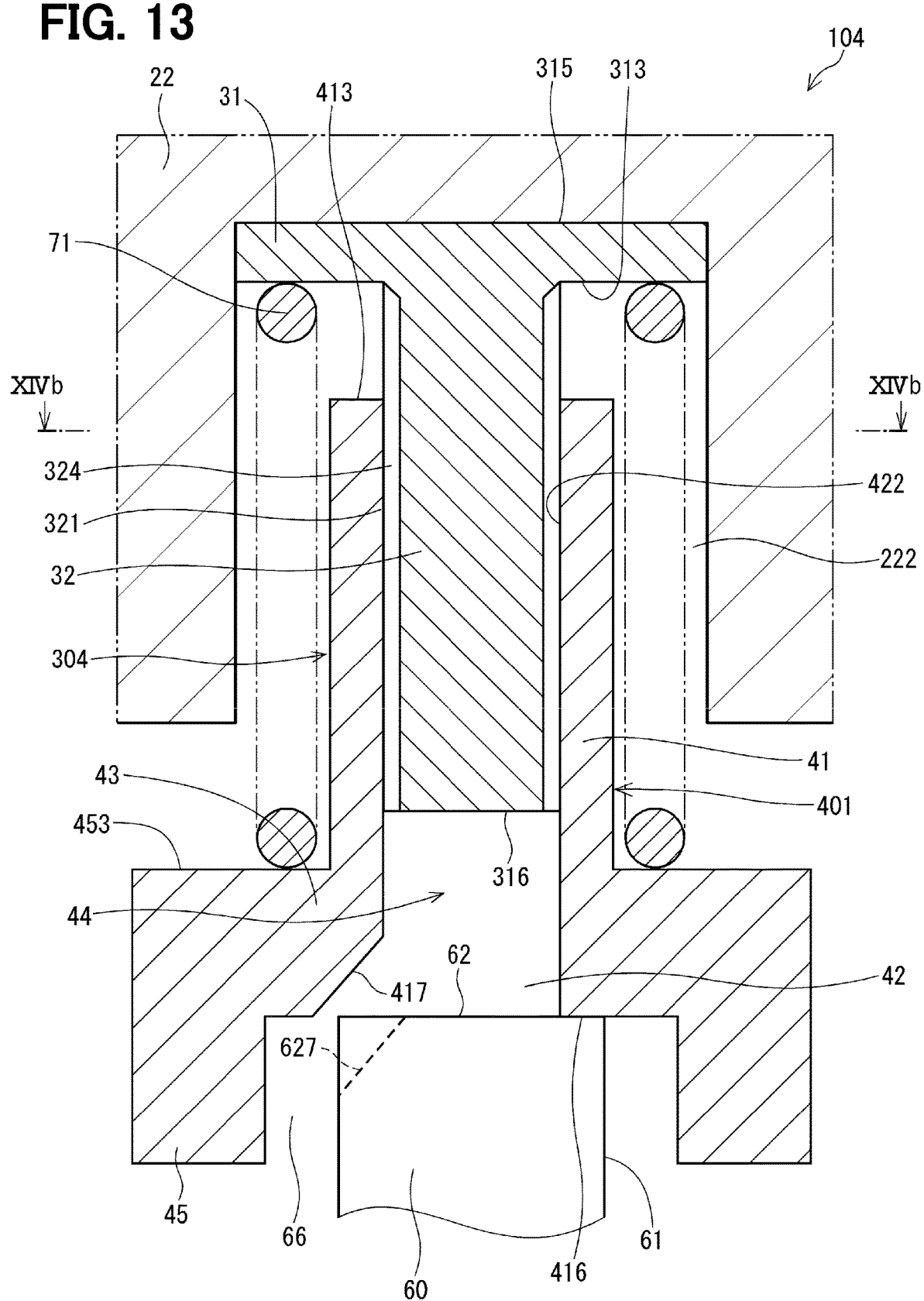
FIG. 13 is an expanded cross-sectional view around the guide and rod of a solenoid valve of a fourth embodiment.
Figure 14A:
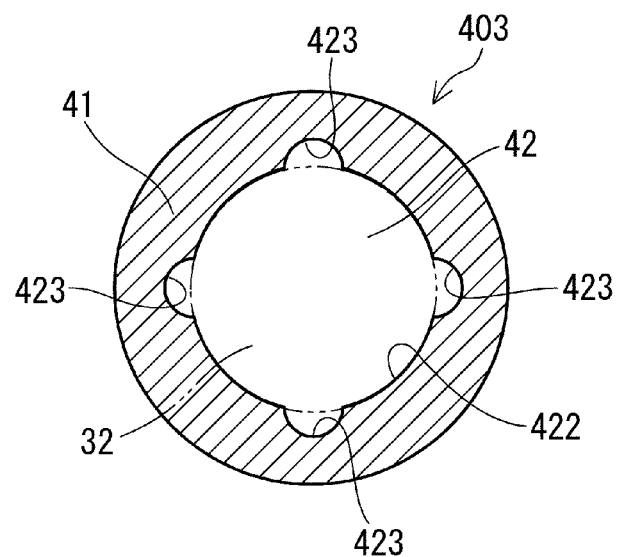
FIG. 14A is a cross-sectional view taken along line XIVa-XIVa in FIG. 12.
Figure 14B:
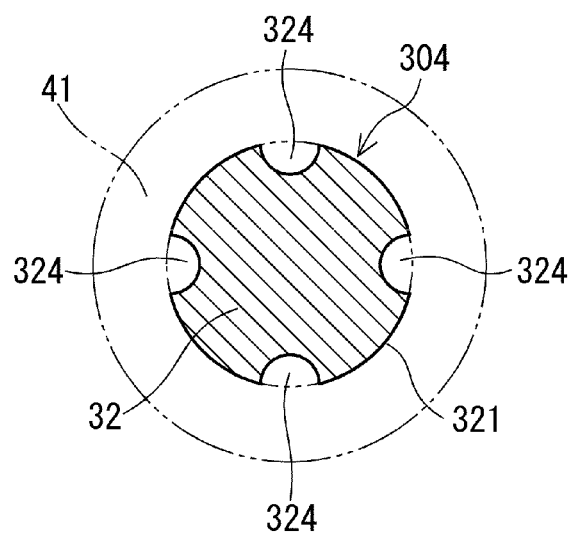
FIG. 14B is a cross-sectional view taken along line XIVb-XIVb in FIG. 13.

In the third and fourth embodiments, the same effect of improving fuel filling property and replacement property as in the second embodiment is realized by different configurations. The solenoid valve 103 of the third embodiment shown in FIG. 12 differs from the solenoid valve 101 of the first embodiment in the configuration of the rod 403. As shown in FIG. 14A, a plurality of axial grooves 423 are formed in the inner wall 422 of the guide hole 42 of the rod 403. The solenoid valve 104 of the fourth embodiment shown in FIG. 13 differs from the solenoid valve 101 of the first embodiment in the configuration of the guide 304. As shown in FIG. 14B, a plurality of axial grooves 324 are formed on the outer wall 321 of the shaft portion 32 of the guide 304.

The third and fourth embodiments are similar in that the groove 423 and the groove 324 function as a "communication path" that connects the intermediate chamber 44 to the recess 222 of the inner stator 22. Similarly to the second embodiment, notches 417, 627 are formed in the lower end surface 416 of the rods 403 and 401 or the upper end surface 62 of the valve 60. The number of grooves is not limited to the four grooves illustrated in FIGS. 14A and 14B, as long as one or more grooves are provided. Further, by combining the third and fourth embodiments, the grooves 423 and 324 may be formed on both the inner wall 422 of the guide hole 42 of the rod 403 and the outer wall 321 of the shaft portion 32 of the guide 304.

Fifth Embodiment

Figure 15:
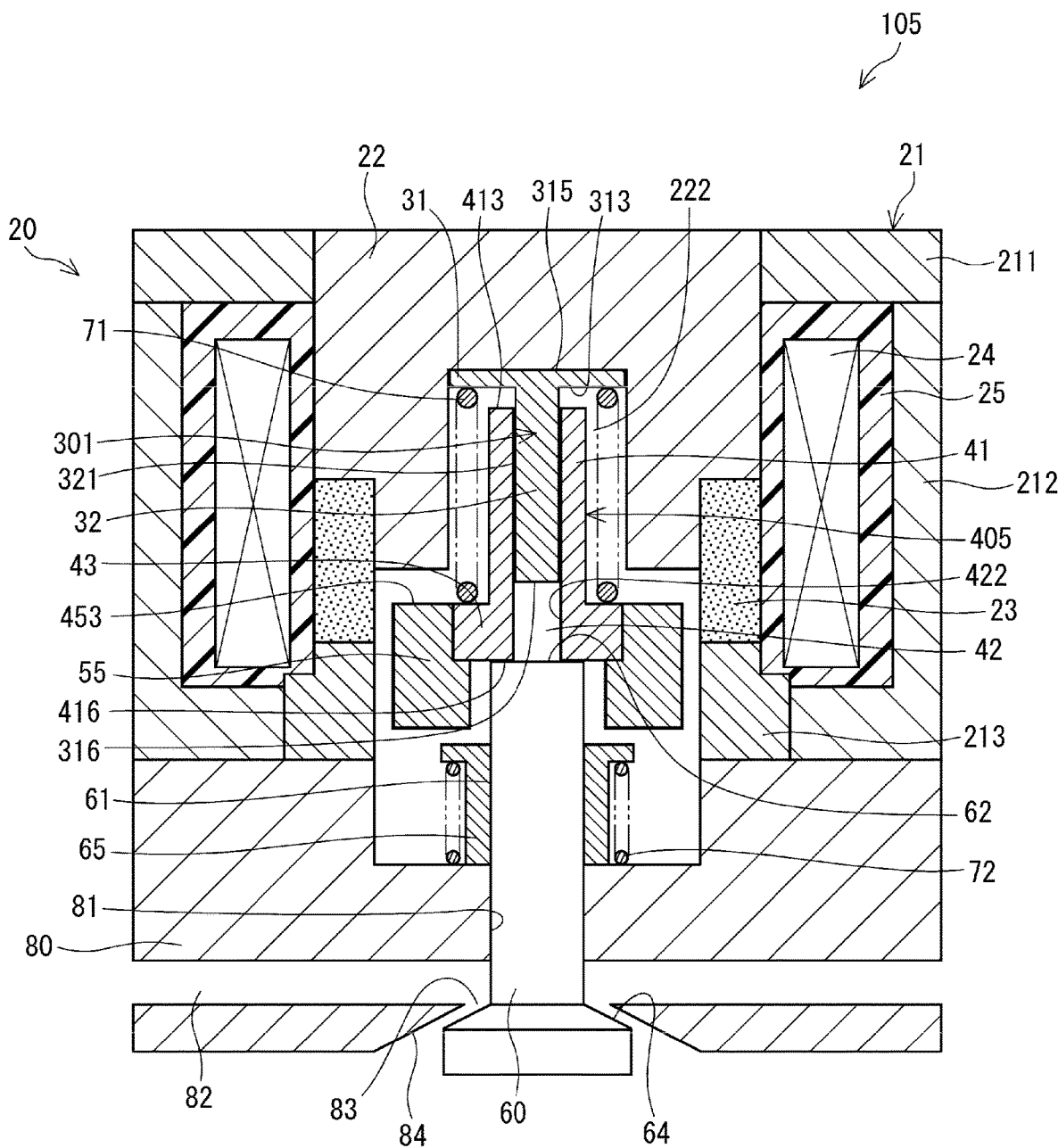
FIG. 15 is a cross-sectional view of a solenoid valve according to a fifth embodiment when not energized.

In the solenoid valve 105 of the fifth embodiment shown in FIG. 15, in contrast to the solenoid valve 101 of the first embodiment, a rod 405 is formed separately from the armature 45 and is fixed to the armature 55 by press fitting, welding, or the like. The rod 405 has a higher hardness than the armature 55. As a result, the reliability of the inner wall 422, which is a sliding part of the rod 405, and the upper end surface 413, which is a collision part, improves. Further, when the rod 405 is manufactured by cutting, the material yield is improved as compared with the armature-integrated rod 401. Similarly, in the second to fourth embodiments and the sixth embodiment described below, the armature and the rod may also be formed separately.

Sixth Embodiment

Figure 16:
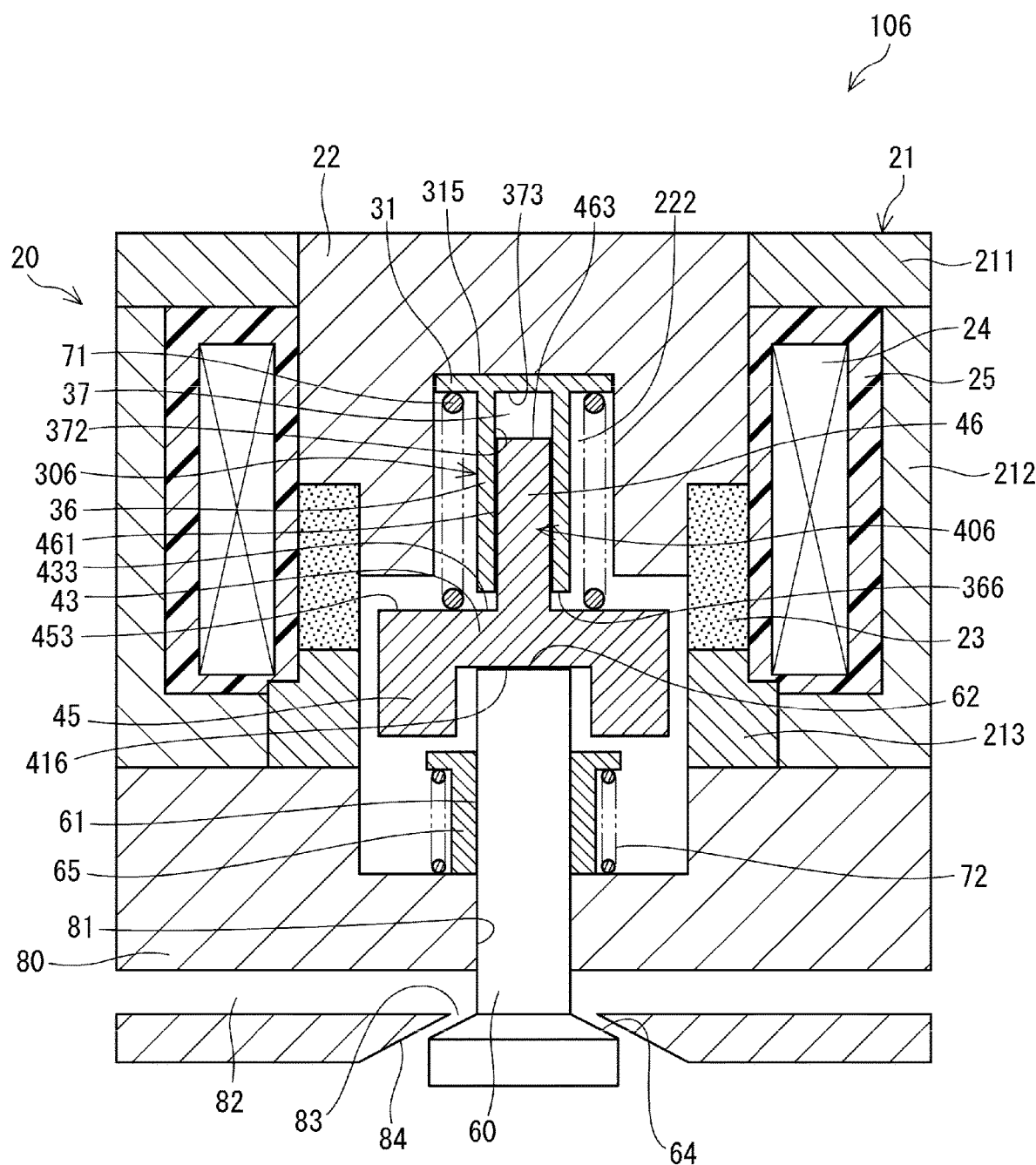
FIG. 16 is a cross-sectional view of a solenoid valve according to a sixth embodiment when not energized.

In a solenoid valve 106 of the sixth embodiment shown in FIG. 16, the male/female coupling relationship between the guide 306 and the rod 406 is reversed with respect to the solenoid valve 101 of the first embodiment. Specifically, the guide 306 includes a cylindrical portion 36 formed with a guide hole 37 that opens toward the rod 406, and the rod 406 includes a shaft portion 46 that fits into the guide hole 37 of the guide 306. As energization is turned on/off, the inner wall 372 of the guide hole 37 of the guide 306 and the outer wall 461 of the shaft portion 46 of the rod 406 slide against each other. Further, the spring 71 is disposed around the cylindrical portion 36 of the guide 306.

The lower end surface 366 of the cylindrical portion 36 of the guide 306 corresponds to a "contact portion". In other words, when the armature 45 is attracted by energization, the lower end surface 366 of the cylindrical portion 36 of the guide 306 is brought into contact with an end surface 433 of the step portion 43 formed at the base of the shaft portion 46 of the rod 406, thereby regulating the amount of movement permitted for the rod 406. In addition, a closed surface 373 of the guide hole 37 of the guide 306 may act as a contact portion to contact an upper end surface 463 of the cylindrical portion 36 of the guide 306.

Compared to the first embodiment, in the sixth embodiment, no guide hole is formed in the rod 406, thereby ensuring a larger contact area between the upper end surface 62 of the valve 60 and the lower end surface 416 of the rod 406. Therefore, the surface pressure of the contact portion can be reduced. Further, by applying the ideas of the second to fourth embodiments to the sixth embodiment, it is possible to form a radial communication hole in the upper portion of the cylindrical portion 36 of the guide 306, or form an axial groove in the inner wall of the guide hole 37 of the guide 306 or the outer wall 461 of the shaft portion 46 of the rod 406. As a result, with the configuration of the sixth embodiment, fuel filling property and replacement property can be improved.

Other Embodiments (A) In the first embodiment, for example, when the armature 45 is attracted and the rod 401 is lifted during energization, the valve 60 is lifted and closed by the biasing force of the valve spring 72. Further, when the energization is turned off, the valve is lowered and opened together with the rod 401 by the biasing force of the spring 71. That is, the valve 60 operates by following the movements of the rod 401. As an alternative, in another embodiment, the valve may be formed integrally with the armature and may be directly operated by the magnetic force and the spring biasing force.

(B) The "spring" in the present disclosure covers not only coil springs but also cylindrical elastic members in general. In other words, any cylindrical elastic member that could be positioned around the cylindrical portion 41 of the rods 401, 403, and 405 or the cylindrical portion 36 of the guide 306 and to generate a biasing force may be interpreted as a "spring".

(C) The solenoid valve of the present disclosure is not limited to an intake valve that opens and closes a fuel passage in a common rail system supply pump, and may be used in general as any solenoid valve that opens and closes a liquid passage. Terms such as "fuel filling property" in the above-described embodiment may be appropriately generalized and interpreted as "liquid filling property" or the like.

The present disclosure is not limited to the embodiments described above and may be implemented with various modifications without departing from the spirit of the present disclosure.

The invention claimed is:

1. A solenoid valve, comprising:
   a coil;
   an inner stator formed radially inward of the coil, the inner stator being part of a magnetic circuit;
   an outer stator formed radially outward of the inner stator, the outer stator being part of the magnetic circuit;
   an armature which is attracted toward the inner stator when the coil is energized;
   a spring that biases the armature in a direction away from the inner stator;
   a rod fixed to the armature or integrally formed with the armature, the rod being configured to integrally reciprocate with the armature;
   a guide that guides reciprocation of the rod; and
   a valve that operates by following the rod to open and close a liquid passage;
   wherein
   the spring and direct sliding contact portions between the rod and the guide are arranged within a recess portion formed in the inner stator and arranged in parallel to each other while overlapping in the axial direction.

2. The solenoid valve of claim 1, wherein
   the guide includes a contact portion that contacts the rod when the armature is attracted by energization of the coil to regulate a movement amount of the rod.

3. The solenoid valve of claim 1, wherein
   the guide has a hardness higher than that of the inner stator.

4. The solenoid valve of claim 1, wherein the armature and the rod are integrally formed.

5. The solenoid valve of claim 1, wherein
   the rod is formed separately from the armature and is fixed to the armature, and
   the rod has a hardness higher than that of the armature.

6. The solenoid valve of claim 1, wherein
   a guide hole is formed in the rod and opens toward the guide, and an inner wall of the guide hole is configured to slide against an outer wall of a shaft portion of the guide.

7. The solenoid valve of claim 6, wherein when the coil is not energized, an upper end surface of the valve that faces the rod abuts on a lower end surface of the rod that faces the valve, an intermediate chamber is defined as a portion of the guide hole between an end surface of the shaft portion of the guide and the upper end surface of the valve, a communication path that communicates the intermediate chamber to the recess portion of the inner stator is formed in at least one of the rod or the guide, and a notch that communicates the intermediate chamber with a radially outer space of the valve is formed at a contact portion between the lower end surface of the rod and the upper end surface of the valve, the notch being formed on at least one of the rod or the valve.

8. The solenoid valve of claim 1, wherein the guide is formed with a guide hole that opens toward the rod, and an inner wall of the guide hole is configured to slide against an outer wall of a shaft portion of the rod.

9. The solenoid valve of claim 2, wherein the contact portion of the guide contacts the rod in the axial direction.

10. The solenoid valve of claim 2, wherein the guide includes a flange portion and a shaft portion that are coaxially formed with each other, and the flange portion is in contact with the recessed portion.

11. The solenoid valve of claim 10, wherein the contact portion is a lower surface of the flange portion, the rod includes an end surface that faces the flange portion in the axial direction, and the end surface of the rod contacts the lower surface of the flange portion.

12. The solenoid valve of claim 1, wherein the guide, the rod, and the spring are arranged in this order from radially inward to outward.

13. The solenoid valve of claim 2, wherein the guide includes a flange portion and a shaft portion that are coaxially formed with each other, the flange portion is in contact with the recessed portion in the axial direction, the shaft portion extends downward from a lower surface of the flange portion, the contact portion is the lower surface of the flange portion, the rod includes an end surface that faces the flange portion in the axial direction, the end surface of the rod contacts the lower surface of the flange portion in the axial direction, and the guide, the rod, and the spring are arranged in this order from radially inward to outward.

14. The solenoid valve of claim 2, wherein the guide includes a flange portion and a shaft portion that are coaxially formed with each other, and a lower surface of the flange portion contacts an upper end surface of the rod.

* * * * *